US009613619B2

(12) United States Patent
Lev-Tov et al.

(10) Patent No.: US 9,613,619 B2
(45) Date of Patent: Apr. 4, 2017

(54) PREDICTING RECOGNITION QUALITY OF A PHRASE IN AUTOMATIC SPEECH RECOGNITION SYSTEMS

(71) Applicant: Genesys Telecommunications Laboratories, Inc., Daly City, CA (US)

(72) Inventors: Amir Lev-Tov, Bat-Yam (IL); Avraham Faizakof, Kfar-Warburg (IL); Yochai Konig, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 266 days.

(21) Appl. No.: 14/067,732

(22) Filed: Oct. 30, 2013

(65) Prior Publication Data
US 2015/0120289 A1   Apr. 30, 2015

(51) Int. Cl.
| | | |
|---|---|---|
| *G10L 21/00* | (2013.01) | |
| *G10L 15/00* | (2013.01) | |
| *G10L 13/00* | (2006.01) | |
| *G10L 15/14* | (2006.01) | |
| *G10L 15/01* | (2013.01) | |
| *G10L 25/30* | (2013.01) | |
| *G10L 15/02* | (2006.01) | |

(52) U.S. Cl.
CPC ............. *G10L 15/01* (2013.01); *G10L 15/02* (2013.01); *G10L 25/30* (2013.01)

(58) Field of Classification Search
USPC ............. 704/202, 232, 259, 256.2, E17.013, 704/E15.017, E15.036, E15.007
See application file for complete search history.

(56) References Cited

U.S. PATENT DOCUMENTS

| | | | | | |
|---|---|---|---|---|---|
| 5,479,563 | A | * | 12/1995 | Yamaguchi | ............. G10L 15/05 |
| | | | | | 704/232 |
| 5,638,487 | A | * | 6/1997 | Chigier | ................... G10L 15/04 |
| | | | | | 704/202 |
| 5,745,874 | A | * | 4/1998 | Neely | ..................... G10L 15/02 |
| | | | | | 704/232 |

(Continued)

FOREIGN PATENT DOCUMENTS

| | | |
|---|---|---|
| EP | 1 895 509 A1 | 3/2008 |
| WO | WO 2004/042698 A1 | 5/2004 |
| WO | WO 2014/035394 A1 | 3/2014 |

OTHER PUBLICATIONS

Oriol Vinyals, Suman Ravuri, and Daniel Povey, "Revisiting Recurrent Neural Networks for Robust ASR," in ICASSP, 2012.*

(Continued)

*Primary Examiner* — Edgar Guerra-Erazo
(74) *Attorney, Agent, or Firm* — Lewis Roca Rothgerber Christie LLP

(57) ABSTRACT

A method for predicting a speech recognition quality of a phrase comprising at least one word includes: receiving, on a computer system including a processor and memory storing instructions, the phrase; computing, on the computer system, a set of features comprising one or more features corresponding to the phrase; providing the phrase to a prediction model on the computer system and receiving a predicted recognition quality value based on the set of features; and returning the predicted recognition quality value.

20 Claims, 15 Drawing Sheets

(56) References Cited

U.S. PATENT DOCUMENTS

| | | | |
|---|---|---|---|
| 7,487,094 | B1 | 2/2009 | Konig et al. |
| 7,912,713 | B2* | 3/2011 | Vair ................ G10L 15/08 704/236 |
| 2004/0162730 | A1 | 8/2004 | Mahajan et al. |
| 2006/0190252 | A1 | 8/2006 | Starkie |
| 2006/0271364 | A1 | 11/2006 | Mirkovic et al. |
| 2007/0043608 | A1 | 2/2007 | May et al. |
| 2007/0129946 | A1 | 6/2007 | Ma et al. |
| 2008/0114595 | A1* | 5/2008 | Vair ................ G10L 15/08 704/236 |
| 2010/0198592 | A1 | 8/2010 | Potter |

OTHER PUBLICATIONS

G. Hinton, Li Deng, Dong Yu, G.E. Dahl, A. Mohamed, N. Jaitly, A. Senior, V. Vanhoucke, P. Nguyen, T.N. Sainath, and B. Kingsbury, "Deep neural networks for acoustic modeling in speech recognition," Signal Processing Magazine, IEEE, vol. 29, No. 6, pp. 82-97, Nov. 2012.*

Tebelskis, Joe, et al. "Continuous speech recognition using linked predictive neural networks." Acoustics, Speech, and Signal Processing, 1991. ICASSP-91., 1991 International Conference on. IEEE, 1991.*

Iso, Ken-ichi; Wantabe, T., "Large vocabulary speech recognition using neural prediction model," in Acoustics, Speech, and Signal Processing, 1991. ICASSP-91., 1991 International Conference on , vol., No., pp. 57-60 vol. 1, Apr. 14-17, 1991.*

Robinson, T., Hochberg, M., & Renals, S. (1996). The use of recurrent neural networks in continuous speech recognition. In Automatic speech and speaker recognition (pp. 233-258). Springer US.*

International Search Report and Written Opinion for PCT/US2014/063265, mailed on Feb. 16, 2015, 12 pages.

Basheer, I.A., "Artificial Neural Networks: Fundamentals, Computing, Design, and Application," *Journal of Microbiological Methods*, vol. 43, 2000. (pp. 3-31).

Cox, Stephen, "High-Level Approaches to Confidence Estimation in Speech Recognition," *IEEE Transactions on Speech and Audio Processing*, vol. 10, No. 7, Oct. 2002. (pp. 460-471).

Kislyuk, Oleg, "Natural Language Text Categorization in Genesys Call Center Software," Genesys Applied Research Presentation, Jan. 17, 2006. (27 pages).

U.S. Appl. No. 13/886,205, filed May 2, 2013, entitled "Fast Out-of-Vocabulary Search in Automatic Speech Recognition Systems". (31 pages).

EP extended search report issued in corresponding EP Application No. 14858418.8, dated Jul. 8, 2016, 11 pages.

Deng, Y., et al., "Estimating Speech Recognition Error Rate without Acoustic Test Data," Expert Opinion on Therapeutic Patents, Informa Healthcare, GB, Sep. 1, 2003, pp. 929-932 XP002306686.

Nielsen, L. B., "A Neural Network Model for Prediction of Sound Quality," The Acoustics Laboratory Technical University of Denmark, pp. 1-90, Report No. 53, 1993; URL:http://www.mp3-tech.org/programmer/docs/LA_report_53.pdf.

* cited by examiner

PREDICTING RECOGNITION QUALITY OF A PHRASE IN AUTOMATIC SPEECH RECOGNITION SYSTEMS

FIELD

Aspects of embodiments of the present invention relate to the field of speech recognition and performing analytics on the output of a speech recognition system. More particularly, aspects of embodiments of the present invention relate to a computer-implemented system and method of predicting the accuracy (precision) and detection rate (recall) of an Automatic Speech Recognition (ASR) system for the purpose of phrase recognition.

BACKGROUND

Organizations and individuals often record and store audio containing spoken conversations. For example, telephone calls made to a contact center operated by a large organization (e.g., a contact center staffed with agents providing customer support or sales), audio logs from a medical practice (e.g., a surgeon's narration of procedures performed in surgery), recordings of lectures, calls to law enforcement and emergency dispatch services, etc. are all often recorded for training, recordkeeping, and other purposes.

Automatic speech recognition (ASR) systems can be used to process and recognize the recorded or real-time spoken language (speech).

SUMMARY

Aspects of embodiments of the present invention are directed to a system and method for predicting the recognition quality of a given phrase in automatic speech recognition (ASR) systems.

Analyzing (or performing analytics on) interactions with customers, clients, and other users of systems is often used to identify trends and patterns in the behaviors of those users. For example, recorded spoken interactions (e.g., speech in telephone conversations) in a sales contact center of a company can be analyzed to categorize the calls based on effectiveness of the sales agents (e.g., frequency of success of upsell attempts), to identify customer complaints, or to identify current problems in the system.

Automatic speech recognition (ASR) systems can be used to process these recorded conversations, automatically recognize particular spoken phrases within the recorded speech, and automatically classify the recorded calls into categories based, on the presence of particular phrases. For example, conversations containing the phrases "Would you be interested in upgrading your current plan?" or "Can I interest you in our premium offering?" could be classified as conversations containing "upsell attempts." According to one embodiment, the phrases associated with various categories are generated by a user (who may be have expertise in designing such categories) who manually inputs phrases into a system based on their knowledge and experience. However, it may be difficult for the user to predict which phrases will be reliably detected and recognized by the ASR system due, for example, to technical limitations of the ASR system.

Aspects of embodiments of the current invention are directed to a system and method for predicting the quality of recognition for a given phrase (or "term" or "query") that is supplied by the user (e.g., supplied as plain text entered via a computer keyboard or equivalent device). As such, users developing a set of terms or phrases of interest can use the computed predictions (or ratings) of the phrases under consideration to quickly answer the question: "What is the likelihood of the given phrase to be recognized well?" In other words, embodiments of the present invention can help a user determine whether any given phrase that they enter will likely be a good phrase (e.g., a phrase that is recognize accurately and reliably) and can assist in finding terms that would perform well in terms of speech recognition performance.

Therefore, embodiments of the present invention allow terms to be evaluated without the slow and computationally intensive of process of analyzing the collection of audio (e.g., recorded telephone calls) to estimate recognition quality results of the supplied phrase. Instead, embodiments of the present invention use the word sequence of the phrase in question and statistical models that were trained in advance to generate a predicted recognition quality of the phrase. In some embodiments, knowledge about the mechanisms of the underlying recognition engine is also used to compute the predicted recognition quality.

In other words, embodiments of the present invention are directed to systems and methods for predicting a recognition quality (or a "confidence measure") of a phrase prior to performing recognition of that phrase within a collection of audio, as opposed to computing this recognition quality post-recognition. This system and method may be referred to herein as a term quality predictor or term quality prediction (TQP).

According to one embodiment of the present invention, a method for predicting a speech recognition quality of a phrase comprising at least one word includes: receiving, on a computer system including a processor and memory storing instructions, the phrase; computing, on the computer system, a set of features comprising one or more features corresponding to the phrase; providing the phrase to a prediction model on the computer system and receiving a predicted recognition quality value based on the set of features; and returning the predicted recognition quality value.

The prediction model may be a neural network.

The neural network may be a multilayer perceptron neural network and wherein the training the model comprises applying a backpropagation algorithm.

The prediction model may be generated by generating, on the computer system, a plurality of training phrases from a collection of recorded audio; calculating, on the computer system, a target value for each of the phrases; calculating a plurality of features of each of the phrases; training, on the computer system, the prediction model based on the features; and setting, on the computer system, a filtering threshold.

The generating the training phrases may include: segmenting a plurality of true transcriptions into a plurality of true phrases; processing the collection of recorded audio using an automatic speech recognition system to generate a recognizer output; tagging matches between the true phrases and the recognizer output as hits; filtering tagged phrases for phrases with a number of hits greater than a threshold value; and returning the plurality of training phrases.

The filtering threshold may be set by optimizing precision and recall values on a test set of phrases of the plurality of training phrases.

The features of the phrase may include at least one of: a precision of a word in the phrase; a recall of a word in the phrase; a phrase error rate; a sum of the precision of the phrase and the recall of the phrase; a number of long words in the phrase; a number of vowels in the phrase; a length of the phrase; a confusion matrix of the phrase; and a feature of a language model.

The method may further include: comparing the predicted recognition quality value to a threshold value; and returning an indicium indicative of the recognition quality of the phrase as the predicted recognition quality value, the indicium being based on the comparison between the predicted recognition quality value and the threshold value.

According to one embodiment of the present invention, a system includes a processor; and a memory, wherein the memory stores instructions that, when executed by the processor, causes the processor to: receive a phrase; compute a set of features including one or more features corresponding to the phrase; provide the phrase to a prediction model and receive a predicted recognition quality value based on the set of features; and return the predicted recognition quality value.

The prediction model may be a neural network.

The neural network may be a multilayer perceptron neural network and wherein the training the model comprises applying a backpropagation algorithm.

The system may be configured to generate the prediction model by: generating a plurality of training phrases from a collection of recorded audio; calculating a target value for each of the phrases; calculating a plurality of features of each of the phrases; training the prediction model based on the features; and setting a filtering threshold.

The system may be configured to generate the plurality of training phrases by: segmenting a plurality of true transcriptions into a plurality of true phrases; processing the collection of recorded audio using an automatic speech recognition system to generate a recognizer output; tagging matches between the true phrases and the recognizer output as hits; filtering tagged phrases for phrases with a number of hits greater than a threshold value; and returning the plurality of training phrases.

The filtering threshold may be set by optimizing precision and recall values on a test set of phrases of the plurality of training phrases.

The features of the phrase may include at least one of: a precision of a word in the phrase; a recall of a word in the phrase; a phrase error rate; a sum of the precision of the phrase and the recall of the phrase; a number of long words in the phrase; a number of vowels in the phrase; a length of the phrase; a confusion matrix of the phrase; and a feature of a language model.

The system may be further configured to: compare the predicted recognition quality value to a threshold value; and return an indicium indicative of the recognition quality of the phrase as the predicted recognition quality value, the indicium being based on the comparison between the predicted recognition quality value and the threshold value.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
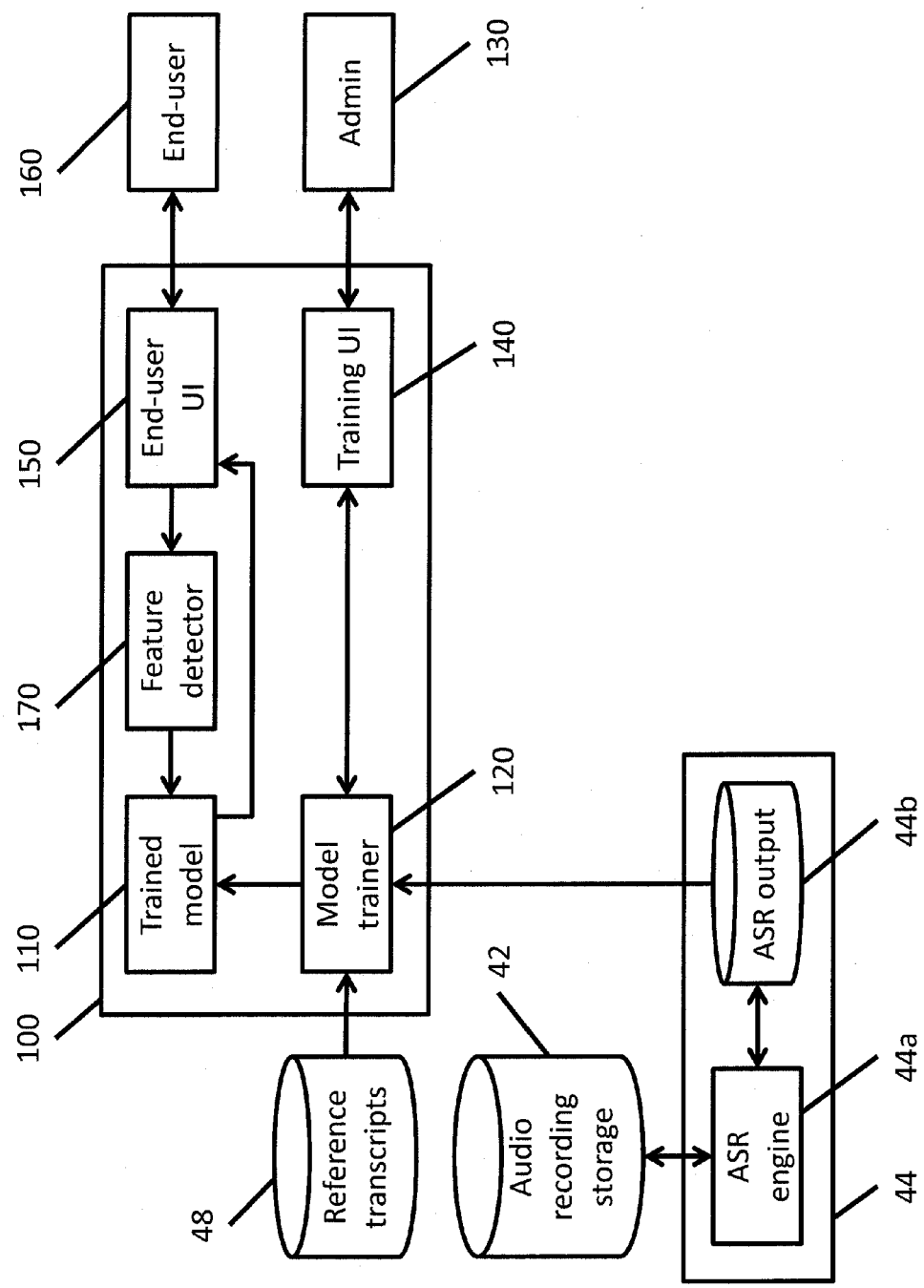
FIG. 1 is a block diagram illustrating a system for computing a predicted recognition quality of a phrase according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

Figure 5:
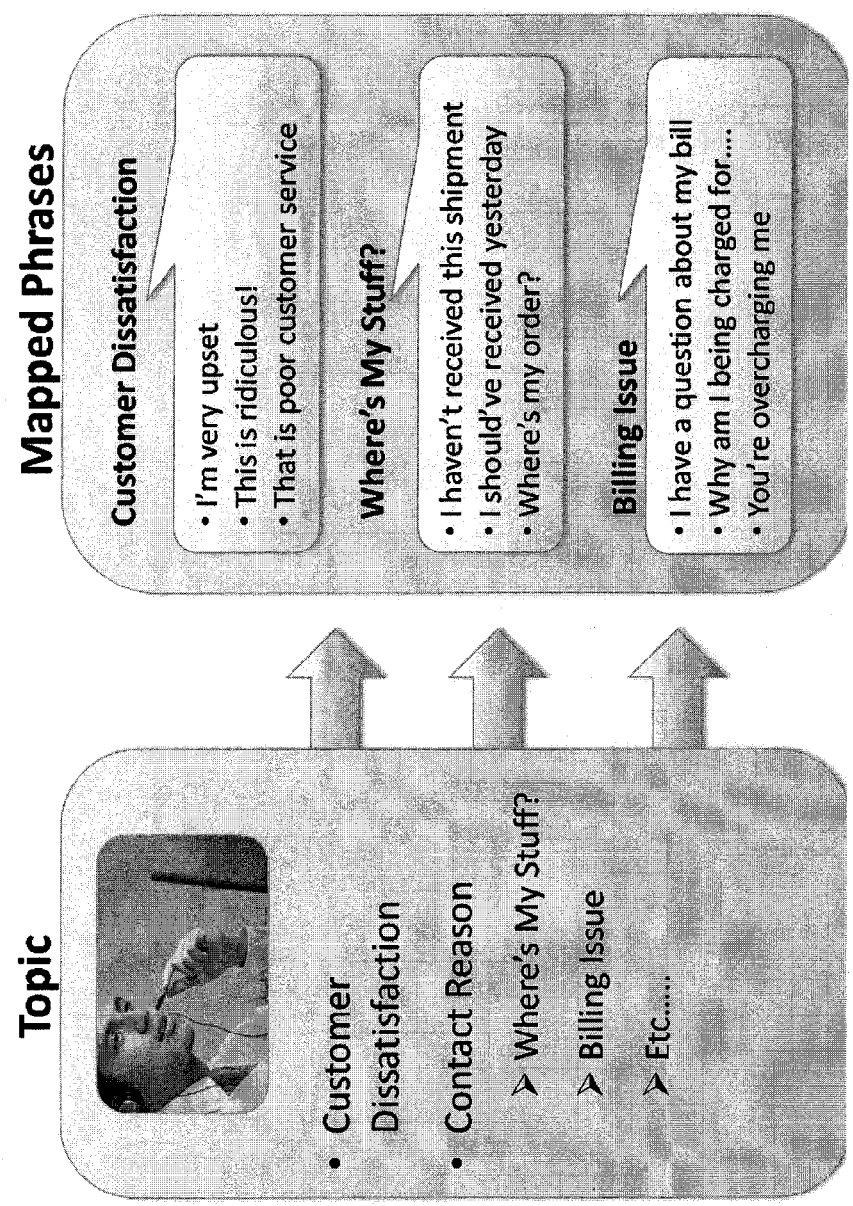
FIG. 5 schematically illustrates relationships between topics and phrases associated with those topics.

Analytics can often be performed on the collection of speech recordings that have been processed by automatic speech recognition systems in order to categorize and automatically detect patterns in the collection of recordings. For example, as shown in FIG. 5, in one embodiment, each topic is defined as union of phrases. If a caller says "Where's my order?" or "I haven't received this shipment," then the call is classified as belonging to the "where's my stuff?" topic. By identifying the number or frequency of calls relating to various topics, trends in aggregate customer behavior can be monitored and detected. For example, in the context of a call center of a mail order company, a large number of calls relating to the "Where's my stuff" topic could indicate a problem with the order fulfillment system.

Because these automatic audio analytics systems depend on accurate recognition of the phrases corresponding to each topic, the quality of the resulting data can depend on the phrases that are selected and can depend on a wide range of variables.

Generally, automatic speech recognition systems, and in particular large vocabulary continuous speech recognition (LVCSR) transcription engines, include three main components: language models (LM), acoustic models (AM), and a decoder. The LM and AM are trained by supplying audio files and their transcriptions (e.g., transcriptions prepared by a human) to a learning module. Generally, the LM is a Statistical LM (SLM).

In general, systems are used to pre-train a LM using contexts of the domain of interest for a given language and AMs. In practice this can be done by transcribing (manually) a sufficiently large number of audio recordings (e.g., telephone calls in the context of a contact center) and using the textual representation of the conversations as an input for training the LM. As such, the trained LM includes information relating to the frequency with which particular phrases are encountered in the trained domain. For example, a LM trained in the domain of a sales contact center would likely indicate that phrases associated with descriptions of product features, comparisons between products, billing addresses, and order status information appear frequently within the domain. In contrast, such a domain would also likely indicate that phrases related to the recent performance of a baseball team.

After the language model has been trained, the language model can be used to recognize speech. An audio utterance serves as an input to a decoder, which outputs a sequence of recognized words. By doing so for each piece of recorded audio (e.g., each call in a call center, as stored as audio files), the application can index the output in an efficient manner which enables an end user to quickly search the text index (LVCSR index). In one embodiment, LVCSR-based indexes allow for ad-hoc searches essentially without predefining anything.

However, some ASR systems, such as phrase-based recognizers (PR), supply higher accuracy in terms of precision and recall when parts of queries of interest are given in advance see, for example, U.S. Pat. No. 7,487,094 "System and method of call classification with context modeling based on composite words," the entire disclosure of which is incorporated herein by reference and U.S. patent application Ser. No. 13/886,205 "Fast out-of-vocabulary search in automatic speech recognition systems," filed in the U.S. Patent and Trademark Office on May 2, 2013, the entire disclosure of which is incorporated herein by reference. In such systems, the phrases (also referred to as "queries" or "tetras") are predefined. The predefined phrases can also be grouped to different topics and categories, so that the recordings (e.g., audio calls or other interactions) can be classified after processing based on whether they contain particular predefined phrases.

In many scenarios, the predefinition is part of a process for customizing the ASR for a specific domain or customer. For example, the process may involve having a person listen to spoken phrases and manually choose important phrases to be added to the system configuration. In conventional systems, selected phrases are tested by performing speech recognition on the phrases (processing the given phrases in the ASR) and measuring the accuracy and detection rate of those selected phrases. See, for instance: "High-Level Approaches to Confidence Estimation in Speech Recognition", Stephen Cox and Srinandan Dasmahapatra, IEEE TRANSACTIONS ON SPEECH AND AUDIO PROCESSING, VOL. 10, NO. 7, OCTOBER 2002. Phrases can then be deleted or modified based on their measured performance.

The above-described manual process can consume a large amount of time because many phrases may not be suitable for the task because they may not be recognized well by the underlying speech recognition engine. For example, a speech recognition system may have particular difficulty in recognizing particular words or phrases, thereby making it difficult for that phrase to be detected in a recording. In addition, performing speech recognition on the phrases can be time consuming and computationally intensive, thereby lengthening each cycle of the iterative process employed by the users to define topics based on phrases.

Therefore, the quality of the resulting set of phrases is often highly dependent on the skill of the person developing the set of phrases and a wide range of people may need to perform such a task, ranging from an expert, professional service analyst who defines and customizes the system for the client to a novice, business user who defines the initial phrases and/or updates the existing phrase definition by editing, deleting, and/or adding new phrases.

Aspects of embodiments of the present invention are directed to a system and method for predicting the recognition quality of a phrase (or term) supplied by a user. For example, if a user typed in the term "I'd like to speak to a supervisor" to supply the term to a system according to embodiments of the present invention, the system would evaluate the supplied phrase and provide a prediction of the likelihood that the supplied term would be correctly recognized in a typical audio recording that would be encountered in the trained environment.

FIG. 1 is a block diagram illustrating a system 100 for computing a predicted recognition quality of a phrase according to one embodiment of the present invention. The system 100 according to embodiments of the present invention includes a machine learning model 110 that is trained on training data by a model trainer module 120. The training data includes the output of an automatic speech recognition engine 44a, where the output of the automatic speech recognition engine may be stored in an ASR output database 44b.

The automatic speech recognition engine 44a and the ASR output database 44b may be components of a voice analytics module 44. The ASR engine 44a is configured to process recorded audio stored in an audio recording storage server 42 (e.g., digital audio files stored in a format such as PCM, WAV, AIFF, MP3, FLAC, OGG Vorbis, etc.) to recognize spoken words (e.g., speech) stored in the recoded audio. In some embodiments, the ASR engine 44a is configured to perform real-time analysis of audio. The recognized data is stored in the ASR output database 44b.

FIG. 1 also illustrates a reference transcripts database 48 which stores "true transcripts" (or "Ref") that are verified transcripts of at least some of the audio stored in the audio recording storage server 42. In some embodiments, these true transcripts may be generated by a human manually transcribing the audio or may be generated by first processing the audio through an ASR engine and then proofreading and correcting the ASR output to generate the true transcripts. Due to the high cost of human involvement in the transcription and verification process, the reference transcripts database 48 generally includes transcripts of less than all of the audio stored in the audio recording storage server 42.

According to one embodiment, ASR output data stored in the ASR output database 44b and reference transcripts stored in the reference transcripts database 48 are supplied to the model trainer 120 to generate the trained model 110. As described in more detail below, according to one embodiment of the present invention, the trained model 110 is a neural network. An administrator 130 or other user may supply parameters to configure the model trainer 120 using a training user interface 140. The training user interface may be provided using any common technique, such as using a web server configured to supply web pages that allow users to enter parameters and to receive parameters submitted by the administrator 130. Similarly, embodiments of the present invention also provide an end-user user interface 150 to be used by an end-user 160, where the end-user UI 150 receives phrases (or "queries") and supplies the phrases to the trained model 110 to be evaluated. The results of the evaluations of the phrases (e.g., classifications of the phrases as being "good" or "bad") are returned to the end-user 160 via the end-user UI 150.

Embodiments of the present invention may also include a feature detector 170 configured to compute various features of the phrases received via the end-user user interface 150. These features will be described in more detail below and may include, for example, the length of the phrase, the number of vowels in the phrase, the number of words in the phrase, and the previously-measured precision and recall of the phrase. The feature detector 170 is configured to output a set of features (or a feature vector or another data structure containing one or more features) based on the supplied phrase. For example, if the features being detected are the number of words in the phrase and the number of vowels in the phrase, then, when supplied with the phrase "when will my order arrive" the feature detector 170 would return the feature vector (or a set of features) [5, 8].

Figure 2:
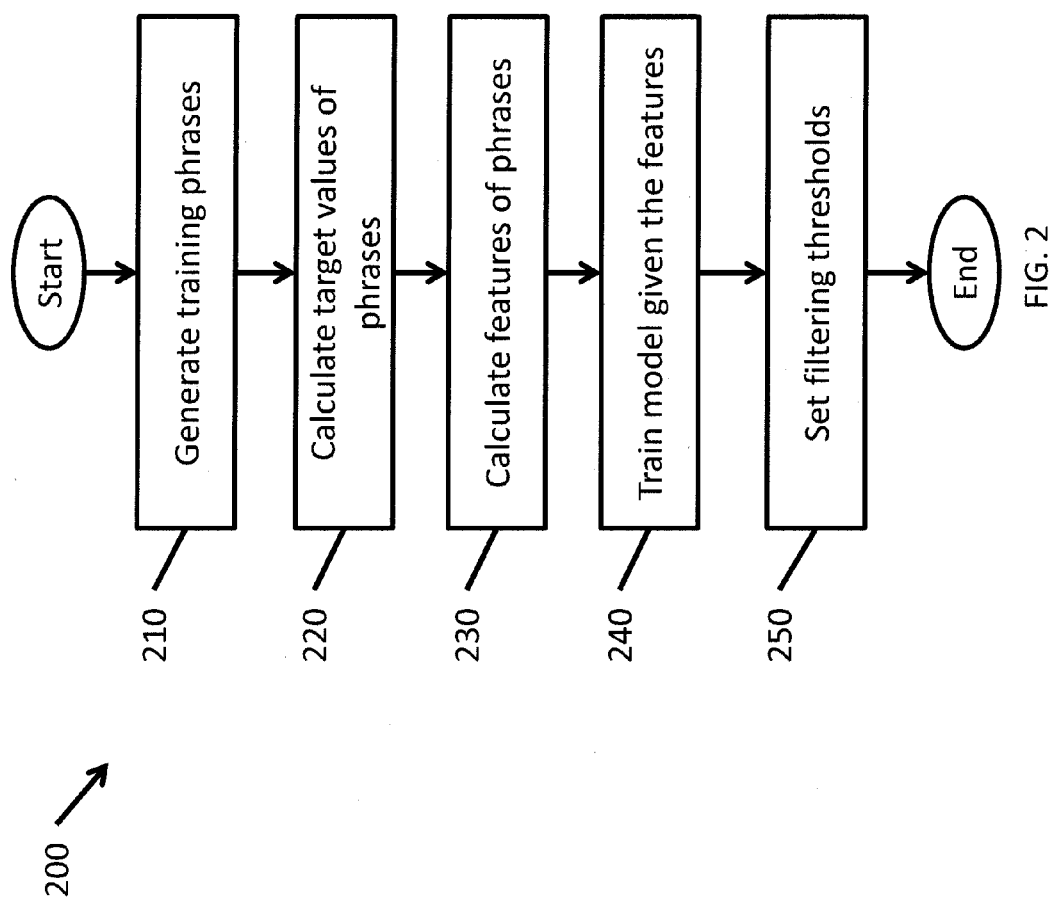
FIG. 2 is a flowchart illustrating a process for training a model for predicting the quality of a phrase according to one embodiment of the present invention.

FIG. 2 is a flow diagram of a training process 200 performed by the model trainer 120 for training the model 110 according to one embodiment. According to one embodiment, the model 110 includes a neural network (NN). In summary, the model trainer 120 is configured to attempt to generate a model 110 that approximates the output of the target function $f$ on the training phrases (target values) when the target values are supplied with the training phrases, where the target function $f$ output represents a measure of the recognition quality of the phrase. The target function is unknown for phrases outside of the collection of recorded audio (e.g., the training data) in the sense that it is impossible to know for certain the value of the target function outputs for inputs outside of the training phrases without performing recognition on audio containing these inputs in a similar process to computing the target function for the training phrases. The model trainer 120 supplies the training data to the model 110 and compares the output of the model 110 with the output of the target function $f$ and iteratively adjusts the parameters of the model 110 until the behavior of the model is determined to be sufficiently similar to the behavior of the target function $f$ (or "$f$ measure").

The process starts and, in operation 210, the model trainer 120 generates training phrases 210 from a collection of recorded audio to be supplied as an input for training the model 110. A process for generating the training data in operation 210 according to one embodiment will be described in more detail below in reference to FIG. 3.

In operation 220 the model trainer 120 calculates a target value for each of the phrases using a target function ($f$) to provide a target for analyzing the training phrases generated in operation 210. In various embodiments of the present invention, a variety of target functions $f$ can be used, where the target functions are defined in terms of true positives (tp), false negatives (fn), and false positives (fp).

According to one embodiment, a true positive (tp) is a correctly identified match (e.g., the phrase is found in both the ASR output and the corresponding portion of the true transcript Ref). According to one embodiment, a false negative (fn) is a match that should have been identified, but was not (e.g., the phrase was found in the true transcript Ref, but not found in the corresponding portion of the ASR output). According to one embodiment, a false positive (fp) is identified as a match, but should not have been (e.g., a portion of the ASR output that was identified as containing the phrase, but the true transcript Ref shows that the corresponding portion of the audio did not contain the phrase).

According to one embodiment, both "recall" (or detection rate) and "precision" (or accuracy) factors are considered in evaluating phrases because both are relevant to the determination of whether a phrase is good or bad. For example, if only precision were considered, then two phrases with similar, high precision could be considered as both being "good," although they may have very different recall values. In this example, if one phrase that has high recall and one that has low recall; the phrase with low recall should be considered as "bad."

In some embodiments of the present invention, a measure of "Phrase Error Rate" (PER) may be considered for evaluating phrases. According to one embodiment, the PER is defined as follows with reference to Equation 1:

$$PER = \frac{fp + fn}{tp + fn} \quad \text{Equation 1}$$

where fp, fn and tp stand for false positives, false negatives, and true positives, respectively. The PER function combines aspects of precision and recall and decreases as precision or recall increases. The PER function provides the property of combining positive changes in both precision and recall in a single scalar function.

In other embodiments, other functions can be used which employ both components of precision or recall. For example, in one embodiment the target function $f$ is the weighted sum of the precision and recall:

$$f = w_1 \cdot \text{precision} + w_2 \cdot \text{recall} \quad \text{Equation 2}$$

where $w_1$ and $w_2$ are weights that can be adjusted to alter the relative influences of precision and recall in the $f$ measure in accordance with the demands of the usage scenario. In some embodiments, $w_1$ and $w_2$ may have the same value (e.g., 1).

According to one embodiment, recall (or "sensitivity") may be calculated by calculating the number of true positives (tp) divided by the number of true positives and false negatives (fn), as set forth in Equation 3.

$$\text{recall} = \frac{tp}{tp + fn} \quad \text{Equation 3}$$

According to one embodiment, precision (or "positive predictive value") can be calculated by calculating the number of true positives divided by the number of true positives and false positives (fp), as set forth in Equation 4.

$$\text{precision} = \frac{tp}{tp + fn} \quad \text{Equation 4}$$

According to one embodiment of the present invention, the model trainer 120 determines the value of the phrases by comparing the $f$ values of the phrases with a threshold for this target function $f$. In one embodiment, the threshold value for $f$ is used to classify the phrase as being "good" or "bad." According to one embodiment, phrases with $f$ value above a $T_{high}$ threshold are considered good and get the target value of 1, and phrases with $f$ values below a $T_{low}$ threshold are considered bad and get the target value of 0. Normally, $T_{high} > T_{low}$ and the size of the gap between $T_{high}$ and $T_{low}$ (e.g., $|T_{high} - T_{low}|$) can be changed depending on a user's desired certainty in the classification. According to one embodiment, phrases with $f$ values between $T_{low}$ and $T_{high}$ are omitted from the training data.

According to one embodiment, the resulting training data after operation 220 is a set of tuples, each of which is a phrase and its corresponding target value, where the target value may be "1" for a "good" phrase and "0" for a "bad" phrase.

In operation 230, according to one embodiment of the present invention, the model trainer 120 calculates features of the phrases in the training data using information taken from the training data. In one embodiment, this information includes information from the categories including, but not limited to: length based features, confusion Matrix (CM) based features, and language model (LM) based features.

According to one embodiment, length based features include, but are not limited to: the number of long words in the phrase; the number of vowels in the phrase; and the length of the phrase. For example, a long word may be defined as a word with a number of characters or phonemes greater than a threshold number. Long words are generally easier to recognize than short words, thereby increasing the likelihood of recognition. Vowels are also typically easier to recognize than other phonemes and therefore the number of vowels also affects the likelihood of recognition.

In addition, in some embodiments (e.g., using phrase recognition based engines), longer phrases are more likely to be recognized than shorter phrases. In other embodiments (e.g., using LVCSR engines), longer phrases might be less likely to be recognized correctly. As such, the influence (or weight) of the phrase length feature in adjusted based on whether the type of the underlying automatic speech recognition system used.

Confusion matrix based features can also be used to represent common confusions between words from recognized audio (the ASR output) and their true transcriptions (Ref). Generally, the ASR output includes precision and recall data regarding every word encountered in the process of training the data, and this data is stored in a confusion matrix. Using the matrix, a prior (or prior probability) regarding precision and recall can be derived at the word level (e.g., for each word in the phrase). Given the described prior value for each word of the phrase, features such as a sum, average, or maximum of all priors of words in the phrase; sum, average, or maximum of priors of long words in the phrase; or an average or maximum of priors of successive n words in the phrase can be computed.

In addition, prior knowledge about the underlying language can be used as a feature. For example, a language model that is used in practice in the recognition process can be used to check the likelihood of encountering the particular sequence of words given in the phrase in the trained domain of the language model (see the above example comparing the likelihood of encountering a sequence of words relating to product features and the likelihood of encountering words relating to a baseball team in the context of a contact center). In another embodiment, any sequence of n words (an n-gram) from the phrase can be taken for computation of likelihood by the language model and serve as an additional feature, as well as an average of those words.

Still referring to FIG. 2, according to one embodiment of the present invention, the model 110 is then trained in operation 240 by the model trainer 120. In one embodiment, the model is neural network such as a multilayer perceptron (MLP) with x input neurons in the input layer, y hidden layers, and one neuron in the output layer. In such embodiments involving a neural network, the model 110 can be trained in accordance with standard techniques as would be known to one of ordinary skill in the art.

Briefly, according to one embodiment, the training data is divided into a training set, a test set, and a development set. The features of each of the phrases of the training set (which were calculated in operation 230) are supplied to the x input neurons of the input layer of the neural network. Using the back-propagation algorithm, the weights of links between x neurons in the input layer, they hidden layers, and the one neuron in the output layer are iteratively adjusted to attempt to reach the computed target values of the training set and the process is stopped when the improvement of the performance on the development set is lower than a threshold value (e.g., a defined threshold value). The resulting model is then validated against the test set. According to one embodiment, the learning rate and momentum are set at 0.1. However, in other embodiments of the present invention, the parameters of the training of the neural network can be set differently.

More information on neural networks, is found, for example, in I. A. Basheer and M. Hajmeer. *Artificial neural networks: fundamentals, computing, design, and application*, JOURNAL OF MICROBIOLOGICAL METHODS 43 (2000) 3-31, the content of which is incorporated herein by reference.

When the trained neural network receives a feature vector, it outputs a value v, such as, for example, a value between 0 and 1. This value serves as a confidence value for the predicted recognition quality of the phrase, as described above. In one embodiment, filtering is used to classify phrases based on their computer predicted recognition quality (see, e.g. operation 250 in FIG. 2). Two thresholds can be set to provide this filtering: high threshold $T_{good}$ and low threshold $T_{bad}$. If $v > T_{good}$, then the corresponding phrase is classified as "good" and if $v < T_{bad}$, the phrase is classified as "bad." Values in between the two thresholds are treated as "don't know" or as being of intermediate quality. The two thresholds are calculated by optimizing the combined precision and recall on the test set and in accordance with particular performance requirements of the application.

Figure 3:
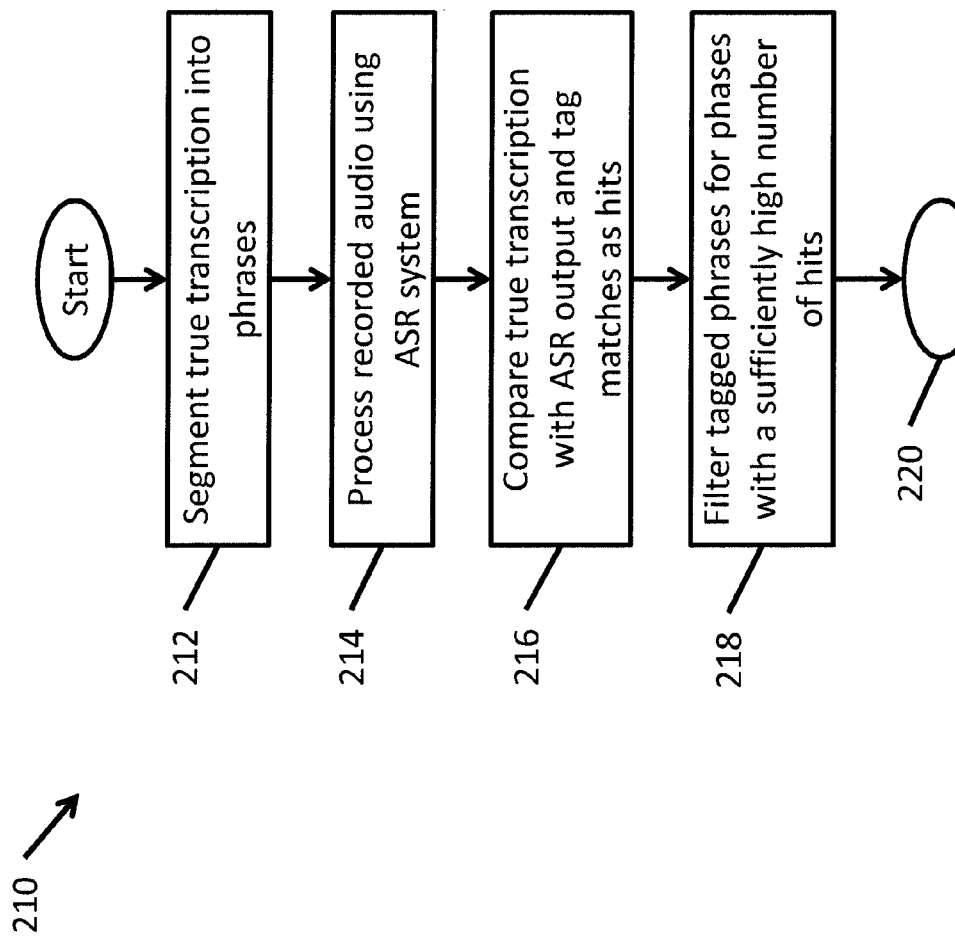
FIG. 3 is a flowchart illustrating a method for generating a set of training terms according to one embodiment of the present invention.

In some embodiments of the present invention, to generate this set of tuples, statistics about performance of phrases are initially collected. FIG. 3 is a flowchart illustrating a method for generating a set of training phrases as shown in operation 210 according to one embodiment of the present invention. Referring to FIG. 3, according to one embodiment, these statistics are collected by processing calls in the ASR system and comparing a search of ASR output to a search of the true transcription (or "Ref" where, for example, the transcription is produced manually by a human) by: segmenting the Ref into phrases 212; processing the recorded audio (e.g., recorded telephone calls) using the ASR system 214; comparing the Ref to the corresponding ASR results (Hyp) and tag similar values as "hit" and different values as "miss" 216; and filtering the tagged phrases for phrases with high enough number of hits (or "instances") 218 (e.g., a number of hits exceeding a threshold value). The output of this process of generating training phrases is a collection of phrases that are correctly recognized with sufficiently high frequency within the collection of recorded audio.

In some embodiments, operation 214 is omitted if the recorded audio has already been processed by an ASR system.

In certain embodiments of the present invention, and due to practical constraints, a true transcript is not always available for a large number of audio recordings. As such, in some embodiments, a partial transcription of the recordings (e.g., transcription of specific phrases chosen in advance) is compared against the output of the ASR system.

Figure 4:
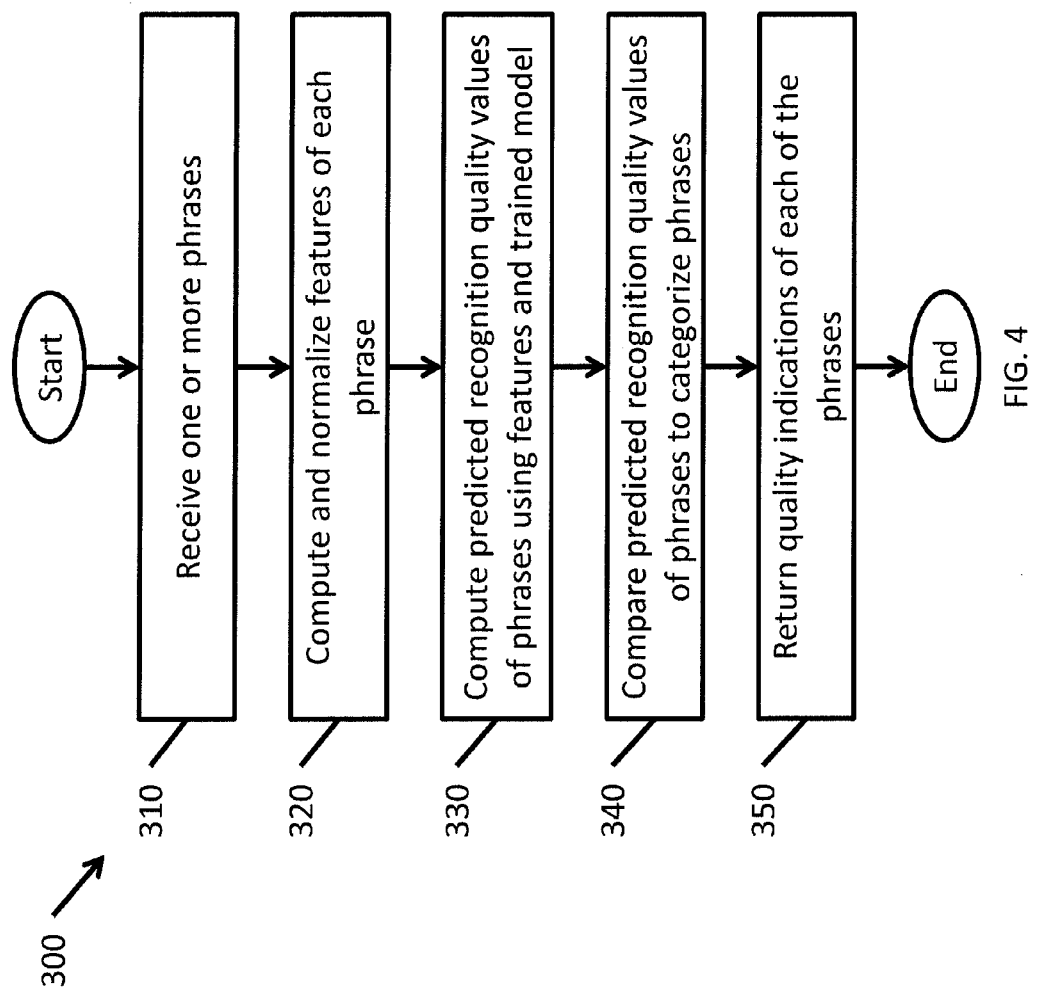
FIG. 4 is a flowchart illustrating a method for using a trained model to predict the quality of a phrase according to one embodiment of the present invention.

As such, if the training data is of sufficient quality to make the training process (or "learning") possible, the process of training the model 200 generates a model capable of predicting the recognition quality of a given phrase within the trained context (e.g., audio recordings similar to those used in the training set). Referring to FIG. 4, given a trained model that is generated as described, for example, with respect to FIG. 2, according to one embodiment, a process 300 used by the system for computing predicted recognition quality using the trained model 110 starts by receiving one or more phrases, where the phrases may be received from a user who enters one or more phrases into a user interface (e.g., by being typed into a form on a web page) 310. In operation 320, the feature detector 170 measures the trained features (e.g., the number of long words, the number of vowels, the confusion matrix features, the language model features, etc.) of the phrase, normalizes the measured values, and generates a feature vector (or a set of features) corresponding to the phrase. The computed sets of features are then supplied to the trained model 110 to compute predicted recognition values of the phrases by supplying the normalized feature vectors to the trained model 110 (e.g., the prediction model generated in process 200) 330.

In some embodiments, the predicted recognition values of the phrases are compared to a threshold value in operation 340 to categorize the phrases (e.g., into "good" or "bad" phrases, or "don't know"). In such embodiments, quality indications of each of the phrases based on the classification of the phrases can then be returned to the user in operation 350. In a user interface according to one embodiment, labels are shown next to each of the phrases supplied by the user to indicate the quality of those terms (see, e.g., FIGS. 6, 7, 8, 9, and 10).

In some embodiments, the computed recognition values are returned to the user along with the quality indications computed in operation 340. In other embodiments, operations 340 and 350 are omitted and the computed recognition values are returned to the user without other quality indications.

In embodiments of the present invention, a trained model can then be used to assist a user in designing a set of phrases to be analyzed by providing predictions of the recognition quality of the supplied candidate phrases. FIGS. 6, 7, 8, 9, and 10 are screenshots of an end-user interface for providing phrases to a system and receiving predictions of phrase recognition quality according to one embodiment of the present invention.

Figure 6:
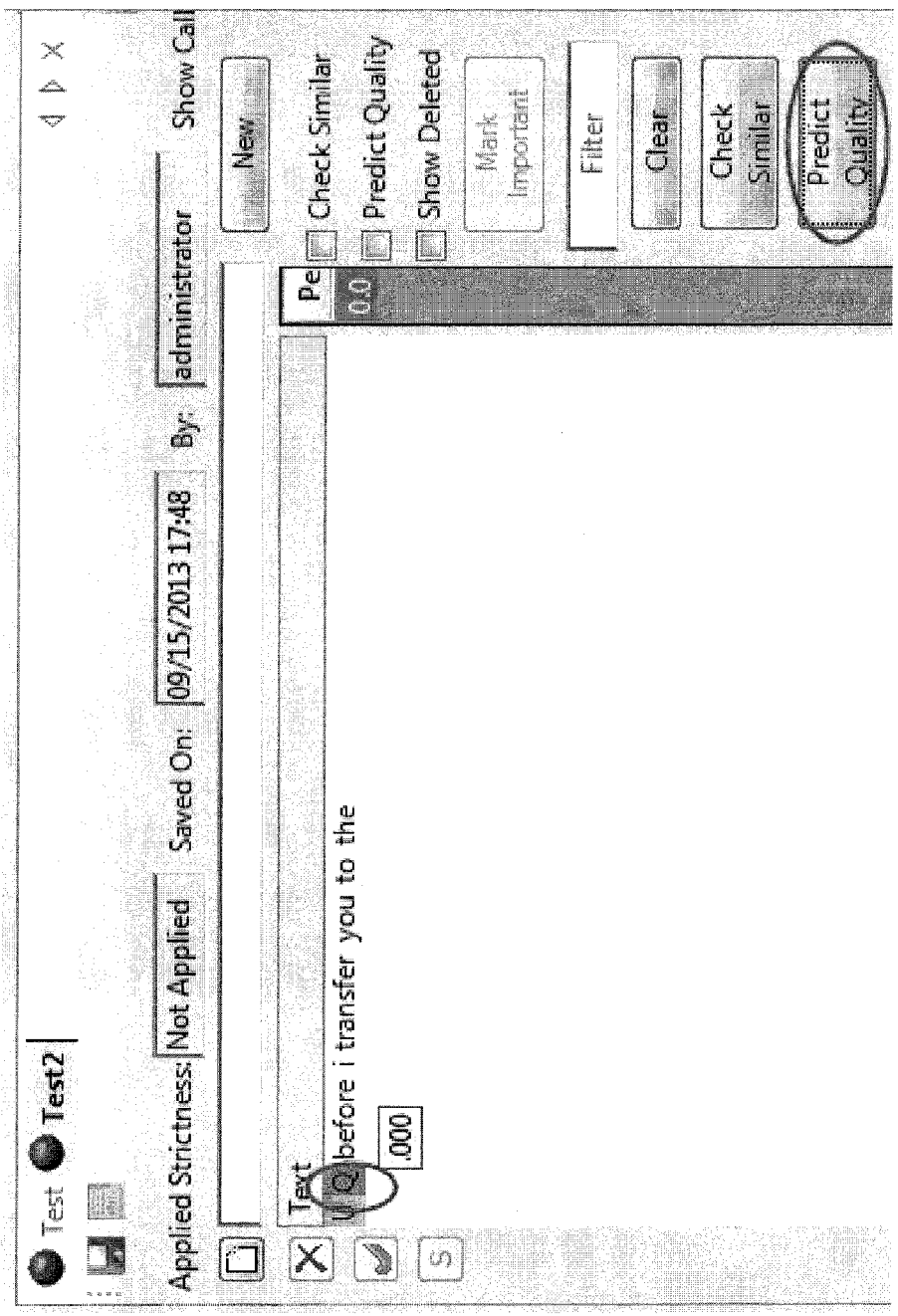
FIGS. 6, 7, 8, 9, and 10 are screenshots of an end-user interface for providing phrases to a system and receiving predictions of phrase recognition quality according to one embodiment of the present invention.
Figure 7:
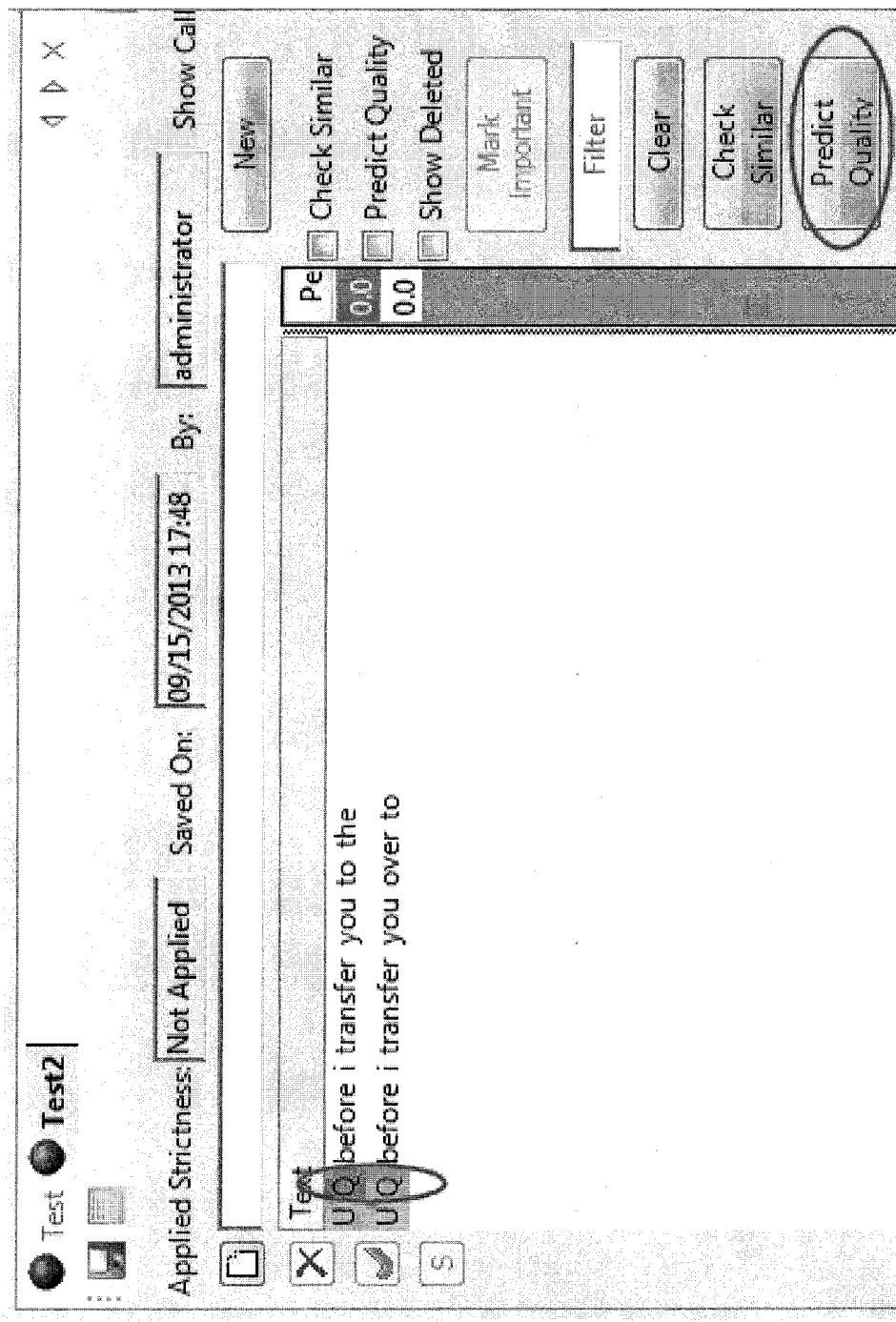
Figure 8:
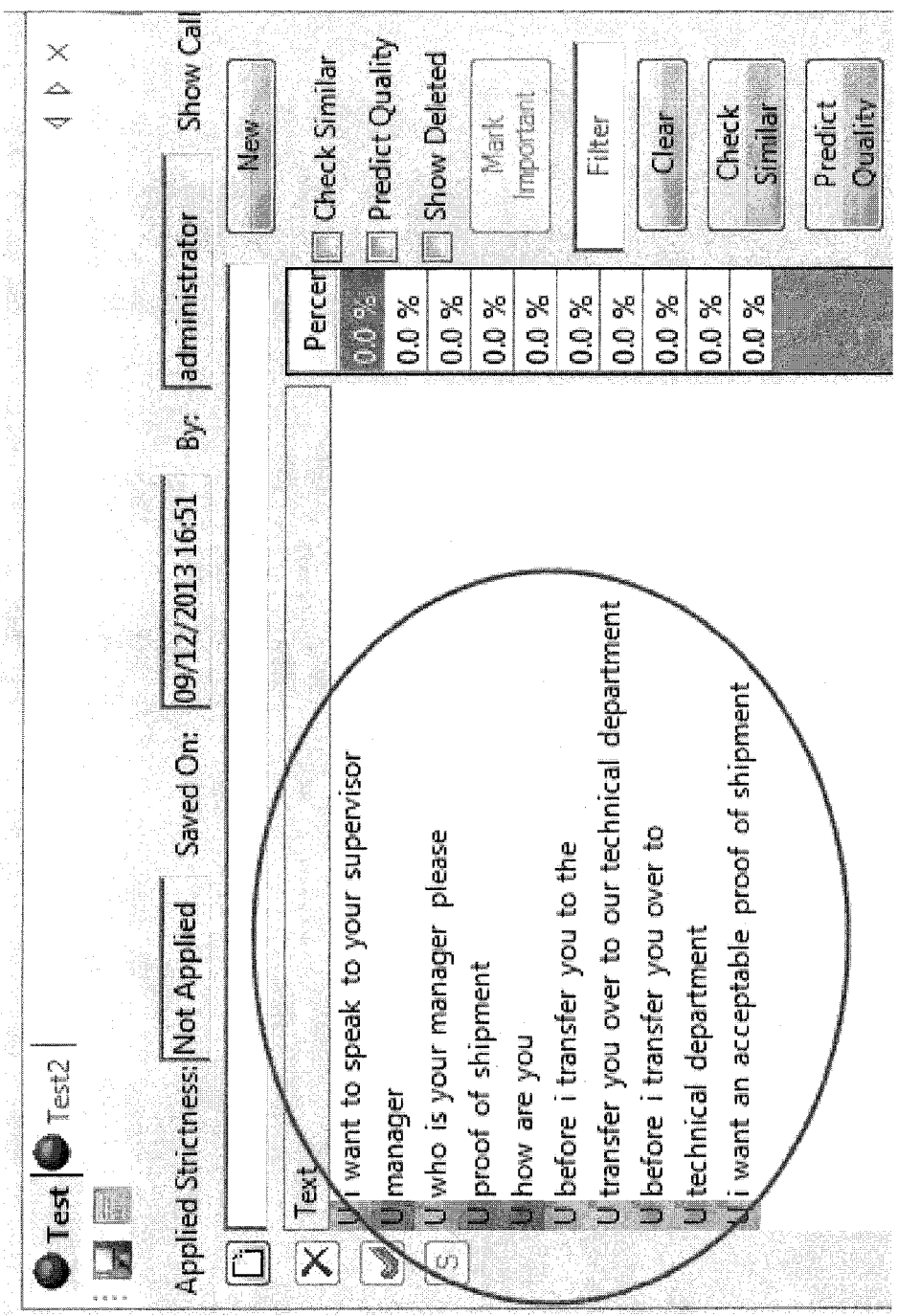
Figure 9:
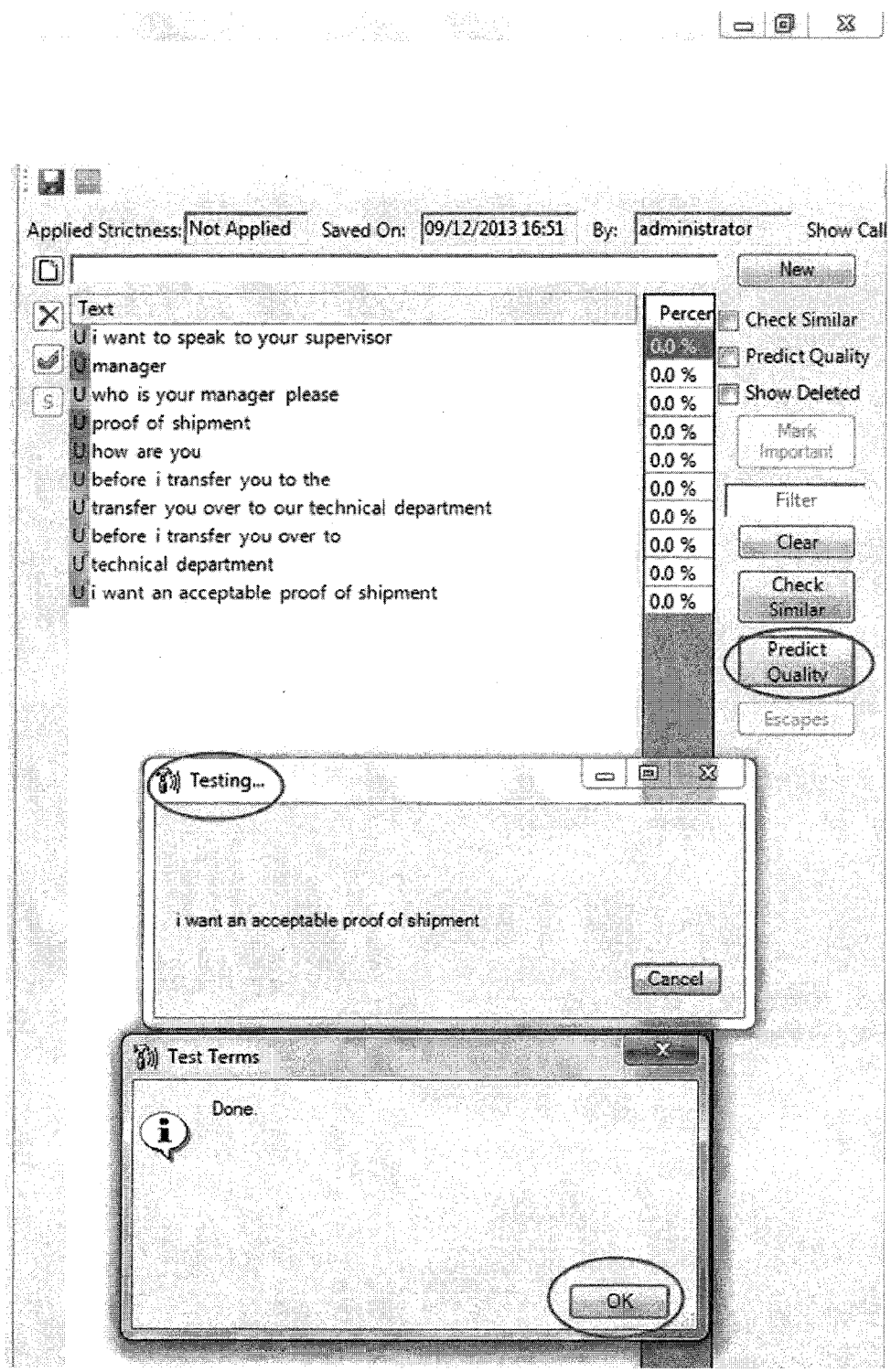
Figure 10:
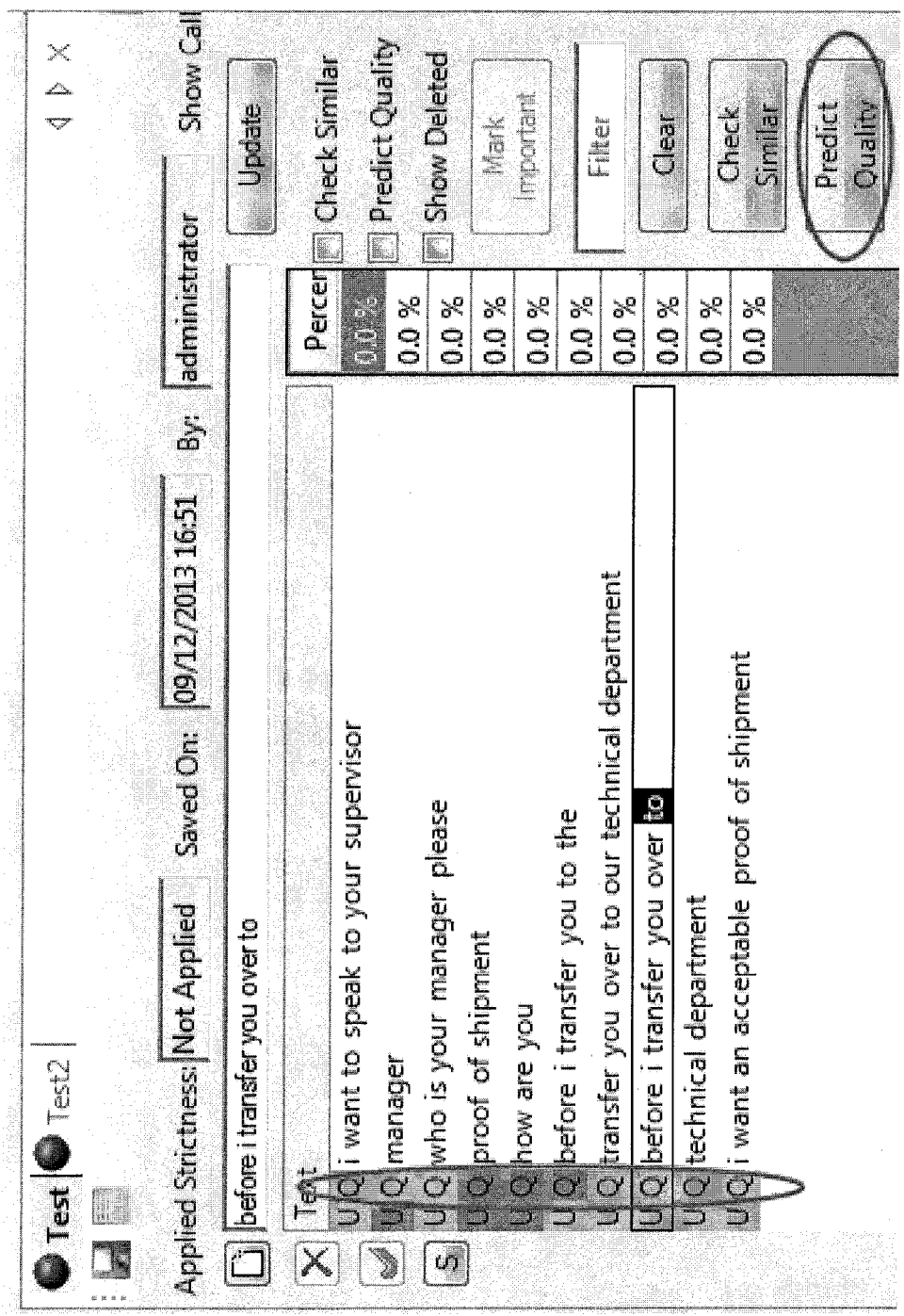

In one embodiment, the user can define a phrase as depicted in FIG. 6 and then press the "Predict Quality" button. (In another embodiment, the predicted quality can appear automatically after the user has stopped typing or while the user is typing). The system informs the user that the term is considered "bad," for example, by marking it in red. The user may then enter a similar term, as shown in FIG. 7 and the system marks the new term as "good," indicating that this new term is more likely to appear in the audio (e.g., more likely to be said in the context of the calls made to this particular contact center) and more likely to be correctly recognized by the automatic speech recognition system. The user can then decide to keep the latter phrase and delete the earlier phrase and can then continue to develop the set of phrases aided by results from the system, see FIGS. 8, 9, and 10.

Embodiments of the present invention are described above in the context of phrase recognition (PR) automatic speech recognition (ASR) systems. However, embodiments of the present invention are not limited thereto. In some embodiments it is possible to define terms, topics, and categories on an ASR engine which is not based on PR, e.g., a large vocabulary continuous speech recognition (LVCSR) engine. The definition can be done in a similar way, as described in FIG. 5; with merely the underlying recognition process being different: the use of an LVCSR ASR engine instead of a PR ASR engine. In those embodiments, the defined terms, topics and categories are searched for in the output of the LVCSR text instead of being inherently used in the PR process.

When used with LVCSR ASR engines, embodiments of the present invention can provide the added value in the form of additional quality prediction information as described in the context of PR ASR engines and, as a result, increase effectiveness of the topics definition process.

Embodiments of the present invention can be applied in a variety of different fields involving recorded audio conversations, including: talk radio recordings; airborne and naval traffic communications; law enforcement, fire, and emergency communications, etc. According to one embodiment of the present invention the call prediction system is implemented in a contact center in which agents conduct telephone and other voice communications with clients, customers, and other individuals.

Figure 11:
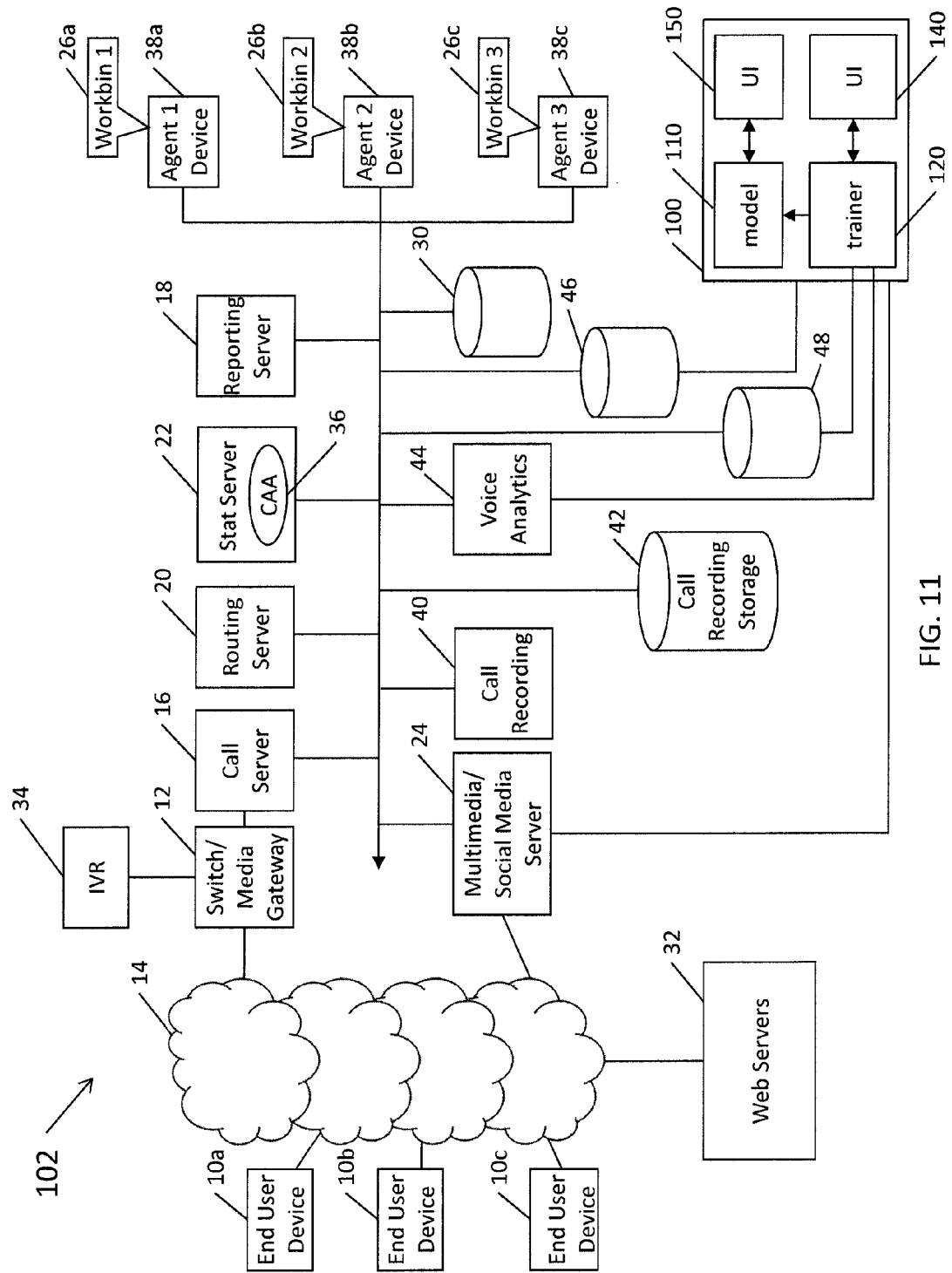
FIG. 11 is a schematic block diagram of a system supporting a contact center that is configured to provide access to recorded audio conversations according to one exemplary embodiment of the invention.

FIG. 11 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22. According to one exemplary embodiment of the invention, the statistics server 22 includes a customer availability aggregation (CAA) module 36 for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22 (or some other server), and which program instructions are executed by a processor. A person of skill in the art should recognize that the aggregation module 36 may also be implemented via firmware (e.g. an application-specific integrated circuit), hardware, or a combination of software, firmware, and hardware.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the contact center also includes one or more mass storage devices 30 for storing different databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a call recording server 40 for recording the audio of calls conducted through the contact center 102, an audio recording storage server 42 (also referred to as a call recording storage server in the context of a call center) for storing the recorded audio, a speech analytics server 44 configured to process and analyze audio collected in the form of digital audio from the contact center 102, a speech index database 46 for providing an index of the analyzed audio, and a reference transcripts (or true transcripts) database 48 for storing and providing a collection of transcripts of recorded calls, where the transcripts were generated or proofed and corrected for accuracy (e.g., through manual review or transcription by a human).

The speech analytics server 44 may be coupled to (or may include) a prediction server 100 including a model trainer 120, a trained model 110, a training user interface 140 for configuring the training of the model 110, and an end-user user interface 150 for receiving phrases and returning prediction results.

The various servers of FIG. 11 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

The various servers of FIG. 11 can be located on-site at the same physical location as the agents of the contact center or may be located off-site (or in the cloud) in a geographically different location, e.g., in a remote data center, connected to the contact center via a network such as the Internet. In addition, some of the servers may be located on-site at the contact center while others may be located off-site, or servers providing redundant functionality may be provided both on-site and off-site to provide greater fault tolerance. In some embodiments of the present invention, functionality provided by servers located off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Each of the various servers in the contact center may be a process or thread, running on one or more processors, in one or more computing devices 500 (e.g., FIG. 12A, FIG. 12B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

Each of the various servers, controllers, switches, and/or gateways in the afore-described figures may be a process or thread, running on one or more processors, in one or more computing devices 1500 (e.g., FIG. 12A, FIG. 12B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

Figure 12A:
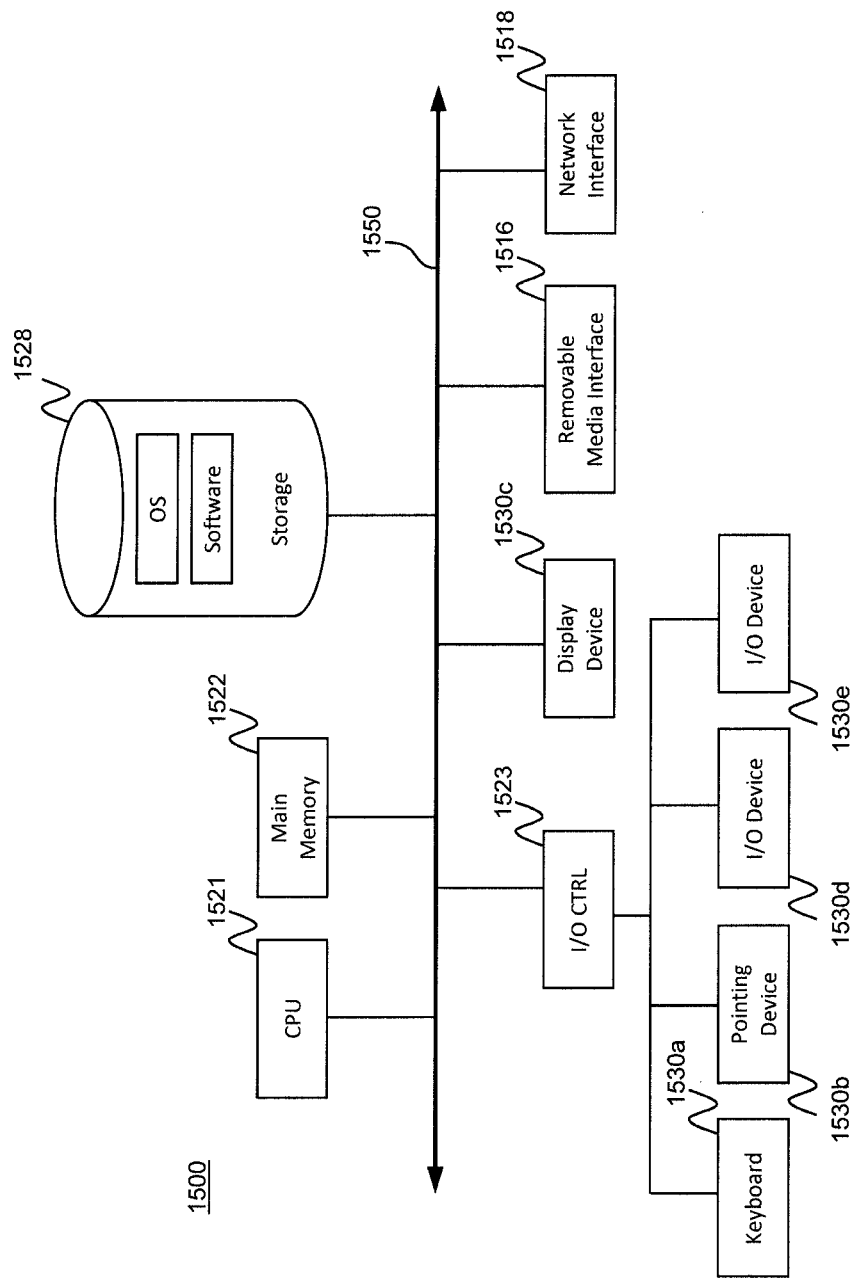
FIG. 12A is a block diagram of a computing device according to an embodiment of the present invention.
Figure 12B:
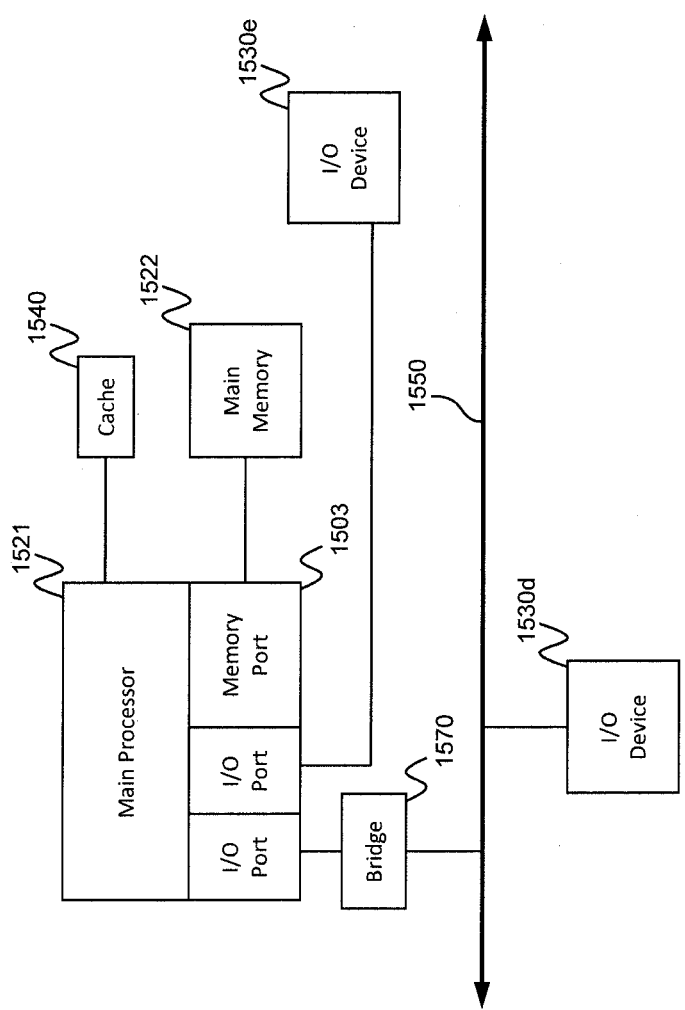
FIG. 12B is a block diagram of a computing device according to an embodiment of the present invention.

FIG. 12A and FIG. 12B depict block diagrams of a computing device 1500 as may be employed in exemplary embodiments of the present invention. Each computing device 1500 includes a central processing unit 1521 and a main memory unit 1522. As shown in FIG. 12A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 12B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 12A, the central processing unit 1521 communicates with the main memory 1522 via a system bus 1550. As shown in FIG. 12B, the central processing unit 1521 may also communicate directly with the main memory 1522 via a memory port 1503.

FIG. 12B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 12A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 12B depicts an embodiment of a computer 1500 in which the central processing unit 1521 communicates directly with I/O device 1530e. FIG. 12B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 12A, may control the I/O devices. The I/O controller may control one or more I/O devices such as a keyboard 1530a and a pointing device 1530b, e.g., a mouse or optical pen.

Referring again to FIG. 12A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 12A and FIG. 12B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 12D:
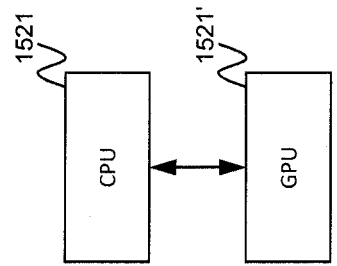
FIG. 12D is a block diagram of a computing device according to an embodiment of the present invention.
Figure 12C:
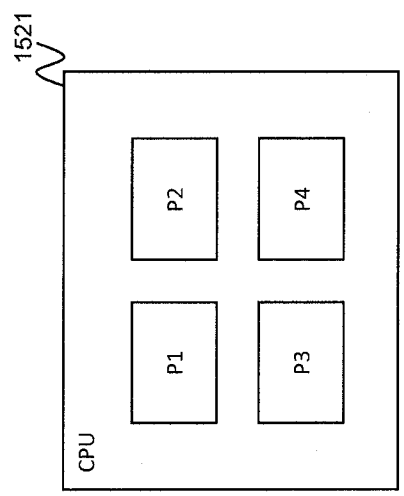
FIG. 12C is a block diagram of a computing device according to an embodiment of the present invention.

As shown in FIG. 12C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 12D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 12E:
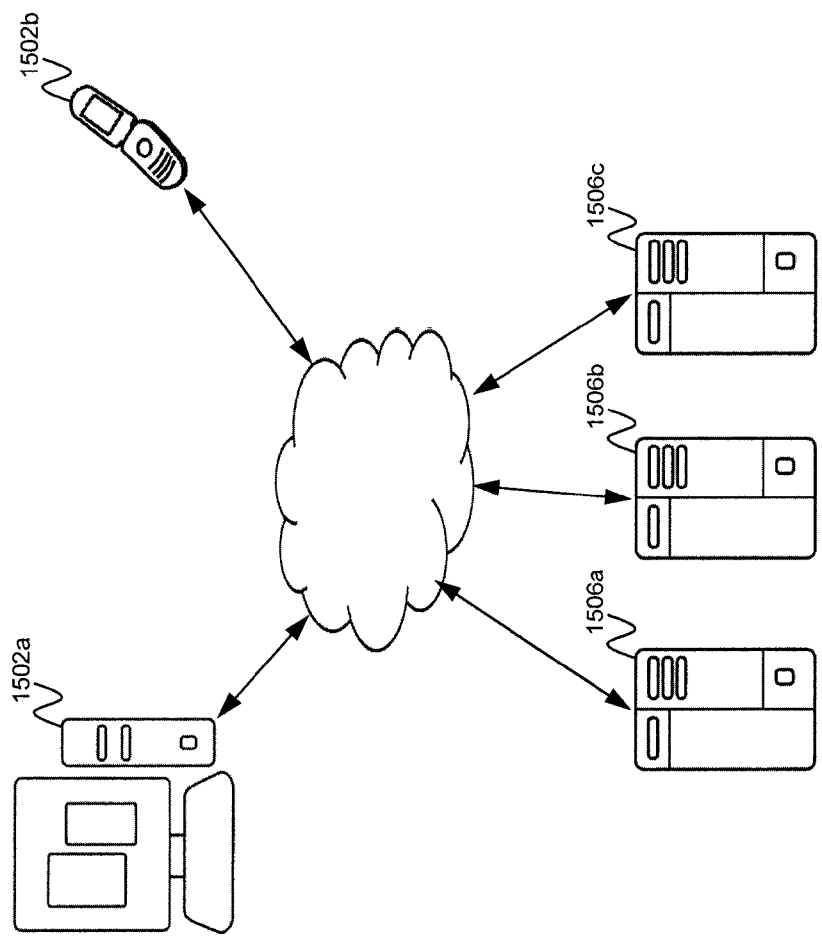
FIG. 12E is a block diagram of a network environment including several computing devices according to an embodiment of the present invention.

A computing device may be one of a plurality of machines connected by a network, or it may comprise a plurality of machines so connected. FIG. 12E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 12E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:
   receiving, on a computer system comprising a processor and memory storing instructions, a phrase, the phrase comprising text including at least one word;
   computing, on the computer system, a set of features comprising one or more features corresponding to the text of the phrase;
   providing the set of features to a prediction model on the computer system;
   receiving, from the prediction model, a predicted recognition quality value for the phrase that is computed based on the set of features, the predicted recognition quality value measuring a likelihood of the phrase being correctly recognized by an automatic speech recognition system when appearing in user speech; and
   displaying, using a graphical user interface associated with the computer system, a label corresponding to the phrase, the label based on the predicted recognition quality value and indicating the likelihood of the phrase being correctly recognized by an automatic speech recognition system when appearing in user speech.

2. The method of claim 1, wherein the prediction model is a neural network.

3. The method of claim 2, wherein the neural network is a multilayer perceptron neural network and wherein the neural network is trained by applying a backpropagation algorithm.

4. The method of claim 1, wherein the prediction model is generated by:

generating, on the computer system, a plurality of training phrases from a collection of recorded audio;

calculating, on the computer system, a target value for each of the training phrases;

calculating a plurality of features of each of the training phrases;

training, on the computer system, the prediction model based on the features; and setting, on the computer system, a filtering threshold.

5. The method of claim 4, wherein the generating the training phrases comprises:

segmenting a plurality of true transcriptions into a plurality of true phrases;

processing the collection of recorded audio using an automatic speech recognition system to generate a recognizer output;

comparing the recognizer output to the true phrases to identify matches between the recognizer output and the true phrases;

based on the comparison, tagging true phrases that match the recognizer output as hits;

determining tagged phrases with a number of hits greater than a threshold value as training phrases; and returning the plurality of training phrases.

6. The method of claim 4, wherein the filtering threshold is set by optimizing precision and recall values on a test set of phrases of the plurality of training phrases.

7. The method of claim 1, wherein the features of the phrase comprise at least one of:

a precision of a word in the phrase;
a recall of a word in the phrase;
a phrase error rate;
a sum of the precision of the phrase and the recall of the phrase;
a number of long words in the phrase;
a number of vowels in the phrase;
a length of the phrase;
a confusion matrix of the phrase; and
a feature of a language model.

8. The method of claim 1, further comprising:

comparing the predicted recognition quality value to a threshold value; and determining the likelihood of the phrase being correctly recognized by an automatic speech recognition system when appearing in user speech based on the comparison between the predicted recognition quality value and the threshold value.

9. A system comprising:

a processor; and a memory, wherein the memory stores instructions that, when executed by the processor, cause the processor to:

receive a phrase comprising text including at least one word;

compute a set of features comprising one or more features corresponding to the text of the phrase;

provide the set of features to a prediction model;

receive, from the prediction model, a predicted recognition quality value for the phrase that is computed based on the set of features, the predicted recognition quality value measuring a likelihood of the phrase being correctly recognized by an automatic speech recognition system when appearing in user speech; and displaying, using a graphical user interface associated with the processor, a label corresponding to the phrase, the label based on the predicted recognition quality value and indicating the likelihood of the phrase being correctly recognized by an automatic speech recognition system when appearing in user speech.

10. The system of claim 9, wherein the prediction model is a neural network.

11. The system of claim 10, wherein the neural network is a multilayer perceptron neural network and wherein the neural network is trained by applying a backpropagation algorithm.

12. The system of claim 9, wherein the system is configured to generate the prediction model by:

generating a plurality of training phrases from a collection of recorded audio;

calculating a target value for each of the training phrases;

calculating a plurality of features of each of the training phrases;

training the prediction model based on the features; and setting a filtering threshold.

13. The system of claim 12, wherein the system is configured to generate the plurality of training phrases by:

segmenting a plurality of true transcriptions into a plurality of true phrases;

processing the collection of recorded audio using an automatic speech recognition system to generate a recognizer output;

comparing the recognizer output to the true phrases to identify matches between the recognizer output and the true phrases;

based on the comparison, tagging the true phrases that match the recognizer output as hits;

determining tagged phrases with a number of hits greater than a threshold value as training phrases; and returning the plurality of training phrases.

14. The system of claim 12, wherein the filtering threshold is set by optimizing precision and recall values on a test set of phrases of the plurality of training phrases.

15. The system of claim 9, wherein the features of the phrase comprise at least one of:

a precision of a word in the phrase;
a recall of a word in the phrase;
a phrase error rate;
a sum of the precision of the phrase and the recall of the phrase;
a number of long words in the phrase;
a number of vowels in the phrase;
a length of the phrase;
a confusion matrix of the phrase; and
a feature of a language model.

16. The system of claim 9, wherein the system is further configured to:

compare the predicted recognition quality value to a threshold value; and determining the likelihood of the phrase being correctly recognized by an automatic speech recognition system when appearing in user speech based on the comparison between the predicted recognition quality value and the threshold value.

17. The method of claim 1, wherein receiving the phrase on the computer system comprises:

receiving the phrase through an input interface of the computer system, the phrase entered by a user of the computer system through the input interface.

18. The method of claim 1, further comprising:

conditioned on the label the indicating that the phrase is likely to be correctly recognized by an automatic speech recognition system when appearing in user speech, selecting the phrase as a parameter to train the automatic speech recognition system.

19. The system of claim 9, wherein receiving the phrase comprises:
    receiving the phrase through an input interface coupled to the processor, the phrase entered by a user through the input interface.

20. The system of claim 9, wherein the instructions cause the processor to:
    conditioned on the label the indicating that the phrase is likely to be correctly recognized by an automatic speech recognition system when appearing in user speech, selecting the phrase as a parameter to train the automatic speech recognition system.

\* \* \* \* \*